(12) United States Patent
Wang (10) Patent No.: US 8,896,773 B2
(45) Date of Patent: Nov. 25, 2014

(54) ARRAY SUBSTRATE AND LIQUID CRYSTAL DISPLAY PANEL

(71) Applicant: Shenzhen China Star Optoelectronics Technology Co., Ltd., Shenzhen, Guangdong (CN)

(72) Inventor: Zui Wang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 139 days.

(21) Appl. No.: 13/642,532

(22) PCT Filed: Sep. 25, 2012

(86) PCT No.: PCT/CN2012/081917
§ 371 (c)(1),
(2), (4) Date: Oct. 21, 2012

(87) PCT Pub. No.: WO2014/043926
PCT Pub. Date: Mar. 27, 2014

(65) Prior Publication Data
US 2014/0078425 A1 Mar. 20, 2014

(30) Foreign Application Priority Data
Sep. 19, 2012 (CN) .......................... 2012 1 0349230

(51) Int. Cl.
*G02F 1/1335* (2006.01)

(52) U.S. Cl.
USPC ................. 349/15; 349/38; 349/48; 349/144; 349/139

(58) Field of Classification Search
CPC ............ H01L 27/1214; H01L 12/3272; H01L 29/786; G02F 1/136213; G02F 1/13624; G02F 1/134336; G02F 1/136286; G02F 1/136227; G02F 1/134309; G02F 1/1343; G02F 1/1345; G02F 1/1368; G02F 1/1335; G02F 1/133512; G02F 1/133514; G02F 1/136; G02F 1/1362; G02F 1/36209; G02F 2001/134345; G02F 2001/13629; G02F 2201/122; G02F 2201/12; G02F 2201/52; G09G 3/3648; G09G 3/2003; G09G 2300/0426; G09G 2300/0452
USPC ......... 349/139, 39, 46, 138, 144, 41, 48, 143, 349/38, 42, 54, 43, 106, 15, 146; 345/87, 345/88; 257/72, 59, E29.151, E51.005, 71; 438/30, 158, 149, 151
See application file for complete search history.

(56) References Cited

U.S. PATENT DOCUMENTS

| 7,659,961 B2 * | 2/2010 | Yoo et al. ................... 349/158 |
| 7,948,568 B2 * | 5/2011 | Park et al. ................... 349/41 |
| 8,203,516 B2 * | 6/2012 | Kim ............................ 345/90 |
| 2012/0013610 A1 * | 1/2012 | Chae ........................... 345/419 |

* cited by examiner

*Primary Examiner* — Thoi Duong
(74) *Attorney, Agent, or Firm* — Andrew C. Cheng (57) ABSTRACT

The present invention provides an array of FPR 3D liquid crystal display, including a plurality of pixel units and circuit affecting on the pixel unit. The pixel unit is divided into main pixel area and sub pixel area, and the circuit is paid out between pixel units. The present invention also provides an FPR 3D liquid crystal display panel. As such, the present invention can improve opening ratio and penetration ratio of liquid crystal display panel in 3D display mode to increase luminance of liquid crystal display panel.

10 Claims, 8 Drawing Sheets

ARRAY SUBSTRATE AND LIQUID CRYSTAL DISPLAY PANEL

BACKGROUND OF THE INVENTION

1. Field of the Invention

The present invention relates to the field of liquid crystal displaying techniques, and in particular to an array substrate and liquid crystal display panel.

2. The Related Arts

Figure 1:
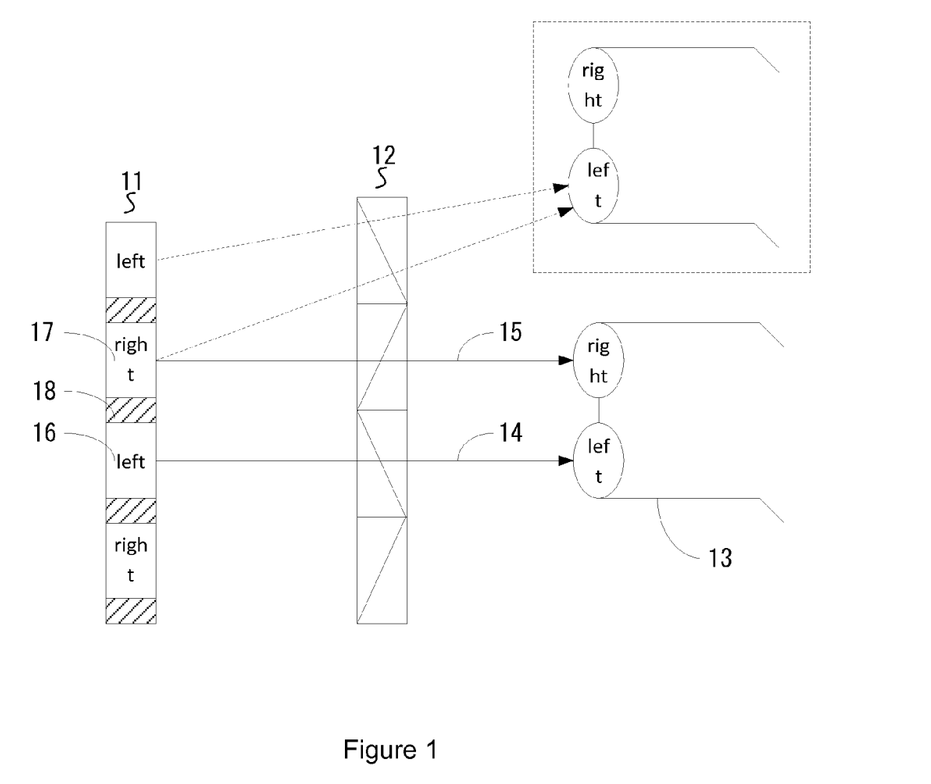
FIG. 1 is a schematic view showing the structure of a known FPR 3D display system with difference of two optical paths at two different view angles.

Film-type patterned retarder (FPR) is a known technique of imaging of 3D liquid crystal displaying. As shown in FIG. 1, FPR 3D display system comprises liquid crystal display panel 11, patterned retarder thin film 12 and patterned retarder glass 13. Liquid crystal display panel 11 comprises pixel 16 forming left-eye signal, pixel 17 forming right-eye signal and black matrix (BM) 18 between the two. FPR 3D display system mainly divides a 3D image into left-eye image 14 and right-eye image 15 through patterned retarder thin film 12 attached to liquid crystal display panel 11, and then transmitting left-eye image 14 and right-eye image 15 through patterned retarder glass 13 to the left eye and right eye of the user respectively. The left and right eyes of the user receive the respective images and the brain synthesizes the two images into a 3D image. FPR 3D display mode has a limitation of view angle. When the viewer is at a larger view angle, the signals will cross-talk to interfere, for example, the signal to the right eye is also observed by the left eye, shown as dash line in FIG. 1. As such, the image is severely cross talked and the clarity is poor. The conventional solution is to increase the width of BM 18 between two pixels to reduce the signal crosstalk possibility.

Figure 2:
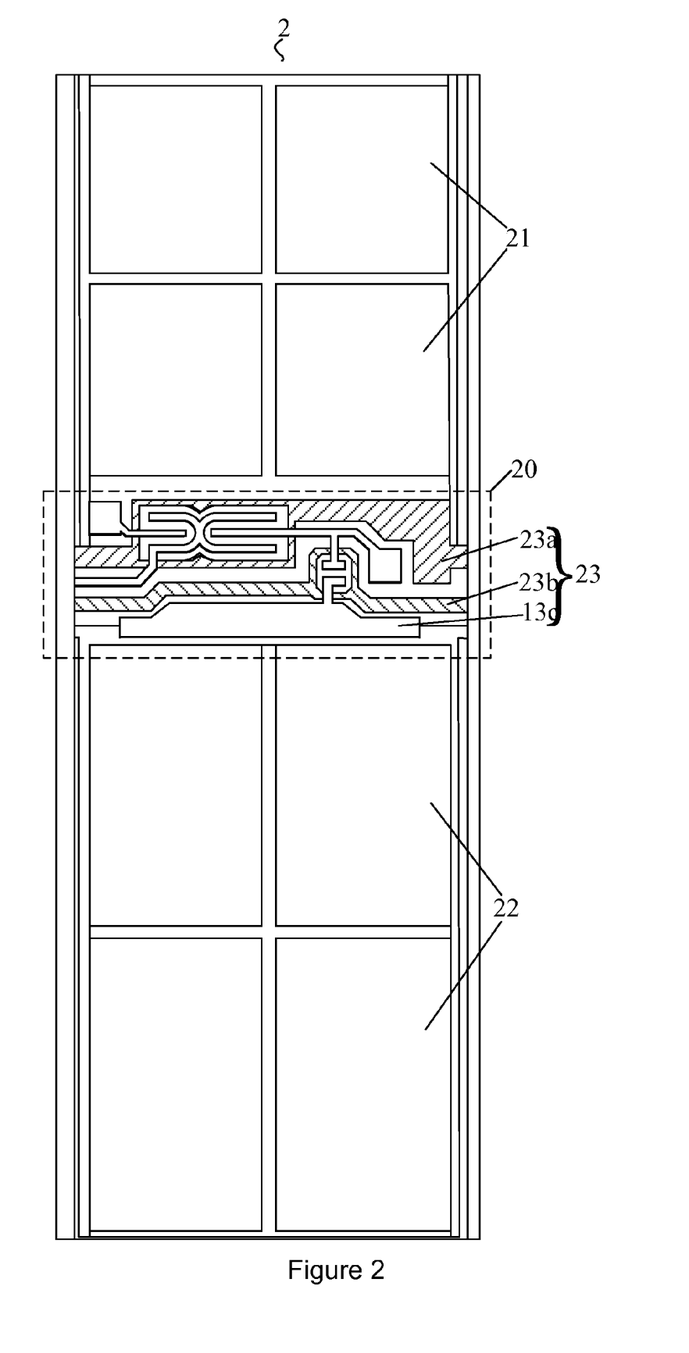
FIG. 2 is a schematic view showing the structure of metal ire layout of pixel unit of a known FPR 3D display system.

Vertical Alignment (VA) liquid crystal display panel may cause color drift at large view angle and resulted in color washout. To improve display effect at large view angle, a low color washout design is usually performed on liquid crystal display panel. As shown in FIG. 2, pixel area 2 of liquid crystal display panel comprises main pixel area 21 and sub pixel area 22. The boundary area 22 of main pixel area 21 and sub pixel area 22 is disposed with metal wire 23. Metal wire 23 comprises charge gate 23a, share gate 23b and share capacitor 23c. In normal display, charge gate 23a is open and share gate 23b is closed, thus, main pixel area 21 and sub pixel area 22 are charged to the same voltage level. Then, charge gate 23a is closed and share gate 23b is open. Because of the effect of share capacitor 23c, the voltage level of sub pixel area 22 is lower than the voltage level of main pixel area 2. Different voltage levels make the liquid crystal molecules of main pixel area 21 and sub pixel area 22 have different orientation distribution to achieve the effect of low color washout.

Figure 3:
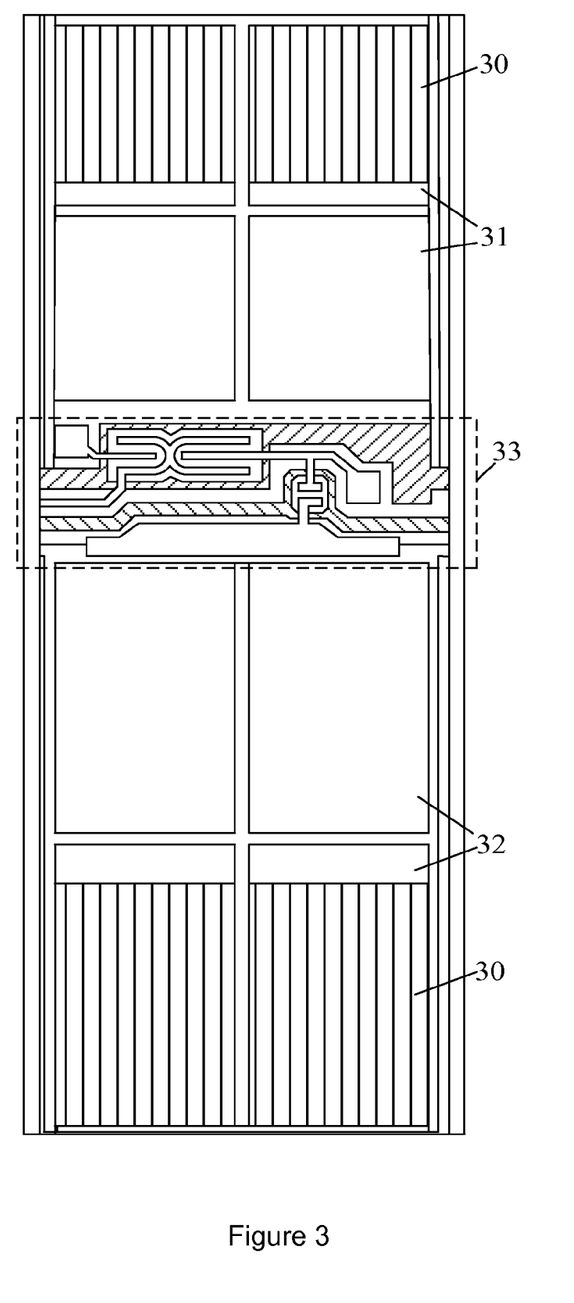
FIG. 3 is a schematic view of black matrix distribution of pixel unit of FIG. 2 in 3D display mode.

VA type display panel, in comparison with conventional display panel, has high contrast and short response time. Therefore, FPR 3D displaying technique is applied to VA type display panel to view 3D image for better visual experience. However, when combining the above low color washout design and FPR 3D displaying technique, as shown in FIG. 3, width of BM 30 between two pixels must increase to ensure view angle in 3D mode. For pixels of low color washout design, the increase of width of BM 30 in other area will cause the opening ratio of pixel greatly reduced because BM already exists in the area where metal wire 33 is located, which leads to reduced penetration rate and reduced luminance of display panel and higher cost. On the other hand, the increase of BM 30 width will result in the great change in area ratio corresponding to main pixel area 31 and sub pixel area 32, which causes severe color washout in upper and lower view angles.

SUMMARY OF THE INVENTION

The technical issue to be addressed by the present invention is to provide an array substrate and liquid crystal display panel, which satisfy the view angle demands of 3D display mode of liquid crystal display panel and improve opening ratio and penetration ratio of the liquid crystal display panel to increase luminance of the panel.

The present invention provides an array substrate for FPR 3D liquid crystal display, which comprises: a plurality of pixel units, each pixel unit comprising a main pixel area and a sub pixel area; circuit for affecting the pixel unit, the circuit being laid out between pixel units; wherein the circuit comprising: a charge gate, a share gate and a share capacitor, wherein the charge gate, share gate and share capacitor of one pixel unit being respectively adjacent to share gate and share capacitor of an adjacent pixel unit and charge gate of another adjacent pixel unit; the array substrate further comprises first TFT, second TFT and third TFT; first TFT and second TFT for respectively controlling displaying and close of main pixel area and sub pixel area, third TFT being connected to share capacitor for controlling voltage difference existing between main pixel area and sub pixel area.

According to a preferred embodiment of the present invention, the circuit comprises a sub data line for inputting electrical signal to sub pixel area, sub data line passes main pixel area and sub pixel area for inputting electrical signal to sub pixel area and share capacitor.

According to a preferred embodiment of the present invention, the circuit comprises a sub data line for inputting electrical signal to sub pixel area, sub data line bypasses main pixel area and passes sub pixel area for inputting electrical signal to sub pixel area and share capacitor.

According to a preferred embodiment of the present invention, the circuit comprises a sub data line for inputting electrical signal to sub pixel area, sub data line bypasses main pixel area and sub pixel area for inputting electrical signal to sub pixel area and share capacitor.

The present invention provides an array substrate for FPR 3D liquid crystal display, which comprises: a plurality of pixel units, each pixel unit comprising a main pixel area and a sub pixel area; circuit for affecting the pixel unit, the circuit being laid out between pixel units.

According to a preferred embodiment of the present invention, the circuit comprises a charge gate, a share gate and a share capacitor, wherein the charge gate, share gate and share capacitor of one pixel unit are respectively adjacent to share gate and share capacitor of an adjacent pixel unit and charge gate of another adjacent pixel unit.

According to a preferred embodiment of the present invention, the circuit comprises a sub data line for inputting electrical signal to sub pixel area, sub data line passes main pixel area and sub pixel area for inputting electrical signal to sub pixel area and share capacitor.

According to a preferred embodiment of the present invention, the circuit comprises a sub data line for inputting electrical signal to sub pixel area, sub data line bypasses main pixel area and passes sub pixel area for inputting electrical signal to sub pixel area and share capacitor.

According to a preferred embodiment of the present invention, the circuit comprises a sub data line for inputting electrical signal to sub pixel area, sub data line bypasses main pixel area and sub pixel area for inputting electrical signal to sub pixel area and share capacitor.

The present invention provides an FPR 3D liquid crystal display panel, which comprises an array substrate and a color filter substrate, the color filter substrate comprising black matrix, and the array substrate comprising: a plurality of pixel units, each pixel unit comprising a main pixel area and a sub pixel area; circuit for affecting the pixel unit, the circuit being laid out between pixel units, and at least a part of circuit being located in vertical projection area of black matrix.

According to a preferred embodiment of the present invention, the circuit comprises a charge gate, a share gate and a share capacitor, wherein the charge gate, share gate and share capacitor of one pixel unit are respectively adjacent to share gate and share capacitor of an adjacent pixel unit and charge gate of another adjacent pixel unit.

According to a preferred embodiment of the present invention, the circuit comprises a data line for inputting electrical signal to sub pixel area, data line passes main pixel area and sub pixel area for inputting electrical signal to sub pixel area and share capacitor.

According to a preferred embodiment of the present invention, the circuit comprises a data line for inputting electrical signal to sub pixel area, data line bypasses main pixel area and passes sub pixel area for inputting electrical signal to sub pixel area and share capacitor.

According to a preferred embodiment of the present invention, the circuit comprises a data line for inputting electrical signal to sub pixel area, data line bypasses main pixel area and sub pixel area for inputting electrical signal to sub pixel area and share capacitor.

The efficacy of the present invention is that to be distinguished from the state of the art. The array substrate of the present invention divides the pixel unit into a main pixel area and a sub pixel area, and lays out the circuit affecting the pixel unit between the pixel units to improve opening ratio and penetration ratio of the liquid crystal display panel in 3D display mode and improve the luminance of the liquid crystal display panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The array substrate of FPR 3D liquid crystal display and liquid crystal display panel of the present invention can improve opening ratio and penetration ratio of the liquid crystal display panel in 3D display mode to increase the luminance of the liquid crystal display panel.

The following description refers to drawings and embodiments of the present invention.

Figure 4:
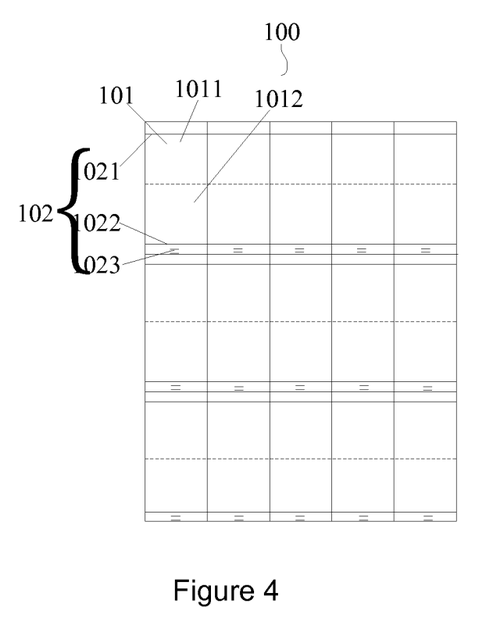
FIG. 4 is a schematic view showing the structure of an embodiment of array substrate of FPR liquid crystal display according to the present invention.

Referring to FIG. 4, FIG. 4 is a schematic view showing the structure of an embodiment of array substrate of FPR liquid crystal display according to the present invention. Array substrate 100 comprises a plurality of pixel units 101 and circuit 102 affecting pixel units 101.

Each pixel unit 101 comprising a main pixel area 1011 and a sub pixel area 1012. Circuit 102 comprises charge gate 1021, share gate 1022 and share capacitor 1023. Circuit 102 is laid out between two vertically adjacent pixel units 101.

Figure 5:
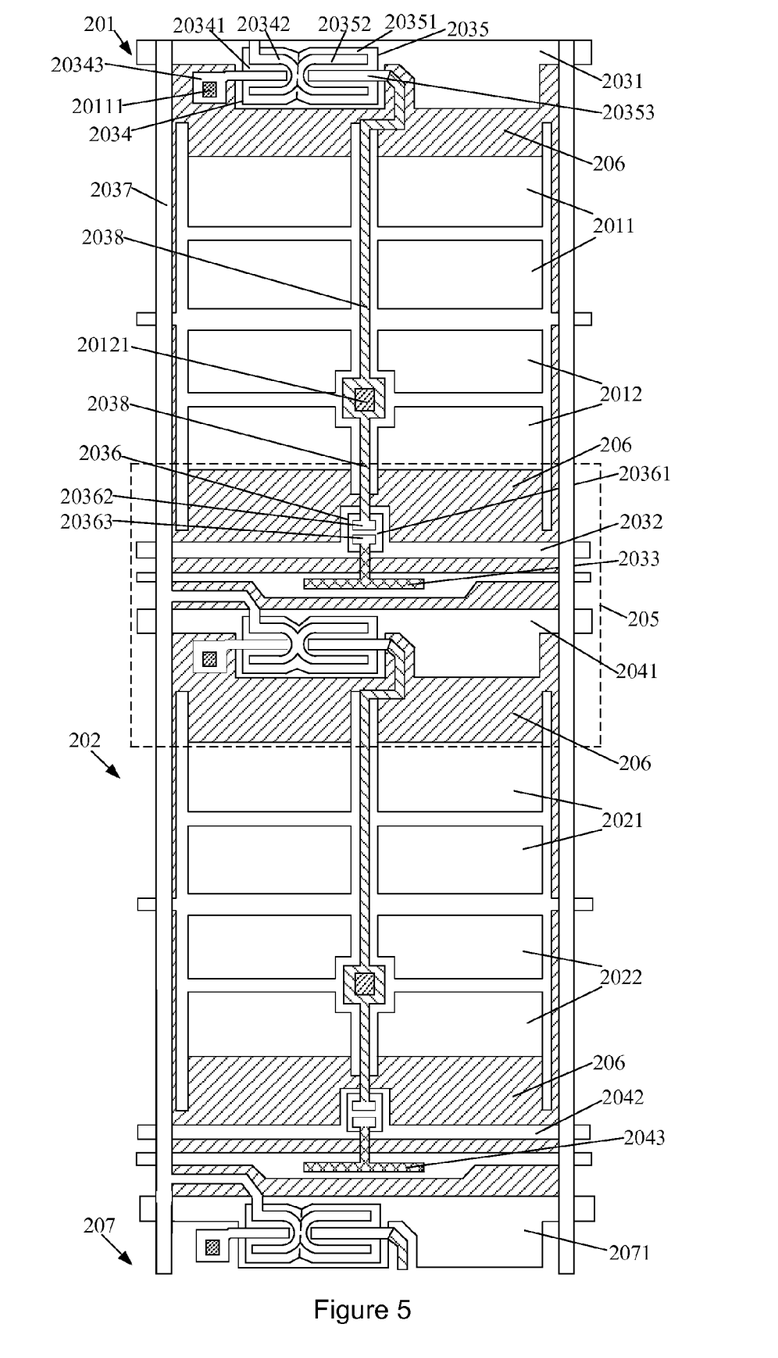
FIG. 5 is a schematic view showing the structure of an embodiment of the circuit of FIG. 4.

Specifically, refer to FIG. 5. The instant embodiment uses the two vertically adjacent pixel units 101 of FIG. 4 for explanation. Two pixel units are first pixel unit 201 and second pixel unit 202. First pixel unit 201 comprises first main pixel area 2011 and first sub pixel area 2012, second pixel unit 202 comprises second main pixel area 2021 and second sub pixel area 2022. First circuit (not shown) is affecting on first pixel unit 201, and comprises first charge gate 2031, first share gate 2032 and first share capacitor 2033. Second circuit (not shown) is affecting second pixel unit 202, and comprises second charge gate 2041, second share gate 2042 and second share capacitor 2043.

In the instant embodiment, first charge gate 2031 of first circuit is disposed at top of first pixel unit 201, first share gate 2032 and second share capacitor 2033 are disposed correspondingly at bottom of first pixel unit 201; second charge gate 2041 of second circuit is disposed at top of second pixel unit 202, second share gate 2042 and second share capacitor 2043 are disposed correspondingly at bottom of second pixel unit 202.

Through the above circuit layout, second charge gate 2041 corresponding to second pixel unit 202 is adjacent to first share gate 2032 and first share capacitor 2033 of adjacent first pixel unit 201, and second share gate 2042 and second share capacitor 2043 corresponding to second pixel unit 202 are adjacent to charge gate 2071 of another adjacent pixel unit 207 (located below second pixel unit 202, only partial view is shown in the figure). First charge gate 2031 corresponding to first pixel unit 201 is adjacent to share gate and share capacitor (not shown) of another adjacent pixel unit (located above first pixel unit 201, not shown).

The instant embodiment places the first circuit affecting first pixel unit 201 at boundary area with other pixel units above and below, for example, boundary area 205 with second pixel unit 202 and places second circuit affecting second pixel unit 202 is placed at boundary areas of second pixel unit 202 with pixel units above and below, for example, boundary area 205 with first pixel unit 201. The layout of each circuit at boundary area with other pixel units above and below makes the boundary area of main pixel area and sub pixel area of corresponding pixel unit become penetration area to increase the area of active area. In addition, boundary area 205 between two pixel units is located at the area 206 covered by vertical projection of black matrix (not shown), and the wiring of each circuit also provides the effect of black matrix. By disposing the wiring at area 206 covered by vertical projection of black matrix, the area of active area is saved. For the demand to increase black matrix to satisfy the requirement of 3D display view angle, the above disposition can reduce the impact on the ratio of main pixel area and sub pixel area, as well as improve opening ratio and penetration ratio of liquid crystal display panel in 3D display mode to increase the luminance of liquid crystal display panel.

Furthermore, the circuit of the instant embodiment comprises sub data line for inputting electrical signal to sub pixel area. Take the first pixel unit as example, and refer to FIG. 5. The area of first charge gate 203 is also disposed with first TFT 2034 and second TFT 2035 for controlling the opening and close of first main pixel area 2011 and first sub pixel area 2012 respectively. The area of first share gate 2032 and first share capacitor 2033 is also disposed with third TFT 2036. Each TFT comprises a gate terminal, a source terminal and a drain terminal. The first circuit further comprises main data line 2037 and sub data line 2038. Main data line 2037 is for supplying electrical signal to first main pixel area 2011 and first sub pixel area 2012, and sub data line 2038 is for transmitting electrical signal to first sub pixel area 2012, wherein the electrical signal is data signal. In addition, first main pixel area 2011 is disposed with main pixel electrode 20111, and first sub pixel area 2012 is disposed with sub pixel electrode 20121.

In the instant embodiment, first gate terminal 20341 of first TFT 2034 is electrically connected to first charge gate 2031, first source terminal 20342 is electrically connected to main data line 2037, and first drain terminal 20343 is electrically connected to main pixel electrode 20111. Second gate terminal 20351 of second TFT 2035 is electrically connected to first charge gate 2031, second source terminal 20352 is electrically connected to main data line 2037, and second drain terminal 20353 is electrically connected to sub data line 2038 and electrically connected to sub pixel electrically 20121 through sub data line 2038. Third gate terminal 20361 of third TFT 2036 is electrically connected to first share gate 2032, third source terminal 20362 is electrically connected to sub data line 2038 and electrically connected to sub pixel electrode 20121 through sub data line 2038, and third drain terminal 20363 is electrically connected to first share capacitor 2033.

In the instant embodiment, sub data line 2038 passes first main pixel area 2011 and first sub pixel area 2012 so as to transmit the data signal supplied by main data line 2037 to first sub pixel area 2012 and first share capacitor 2033.

In 3D display mode, first charge gate 2031 inputs scan signal to conduct first TFT 2034 and second TFT 2035, and then main data line 2037 inputs data signal required by 3D display. Data signal entering first main pixel area 2011 is inputted to first TFT 2034 from first source terminal 20342, and outputted to main pixel electrode 20111 through first drain terminal 20343 so that first main pixel area 2011 displays 3D image. Data signal entering first sub pixel area 2012 is inputted to first TFT 2035 from second source terminal 20352, and outputted to sub data line 2038 through second drain terminal 20353. Data signal is transmitted to sub pixel electrode 20121 through sub data line 2038. At this point, main pixel electrode 20111 and sub pixel electrode 20121 have the same voltage level, that is, first main pixel area 2011 and first sub pixel area 2012 have the same voltage level. Stop inputting scan signal to first charge gate 2031, and first share gate 2032 inputs scan signal to conduct third TFT 2038. Because third source terminal 20361 is electrically connected to sub pixel electrode 20121 through sub data line 2038, when third TFT 2036 is conductive, the voltage signal of sub pixel electrode 20121 is transmitted to third source terminal 20361 through sub data line 2038, and then coupled with first share capacitor 2033 electrically connected to third drain terminal 20363. Under the effect of first share capacitor 2033, the voltage level of sub pixel electrode 20121 is lower than the voltage level of main pixel electrode 20111, that is, a voltage level difference exists between first main pixel area 2011 and first sub pixel area 2012.

The voltage level difference existing between first main pixel area 2011 and first sub pixel area 2012 makes the liquid crystal molecules in two pixel areas have different orientation distribution. As such, the liquid crystal display panel in 3D display mode can improve color difference at large view angle to reduce color distortion and improve display effect.

Figure 6:
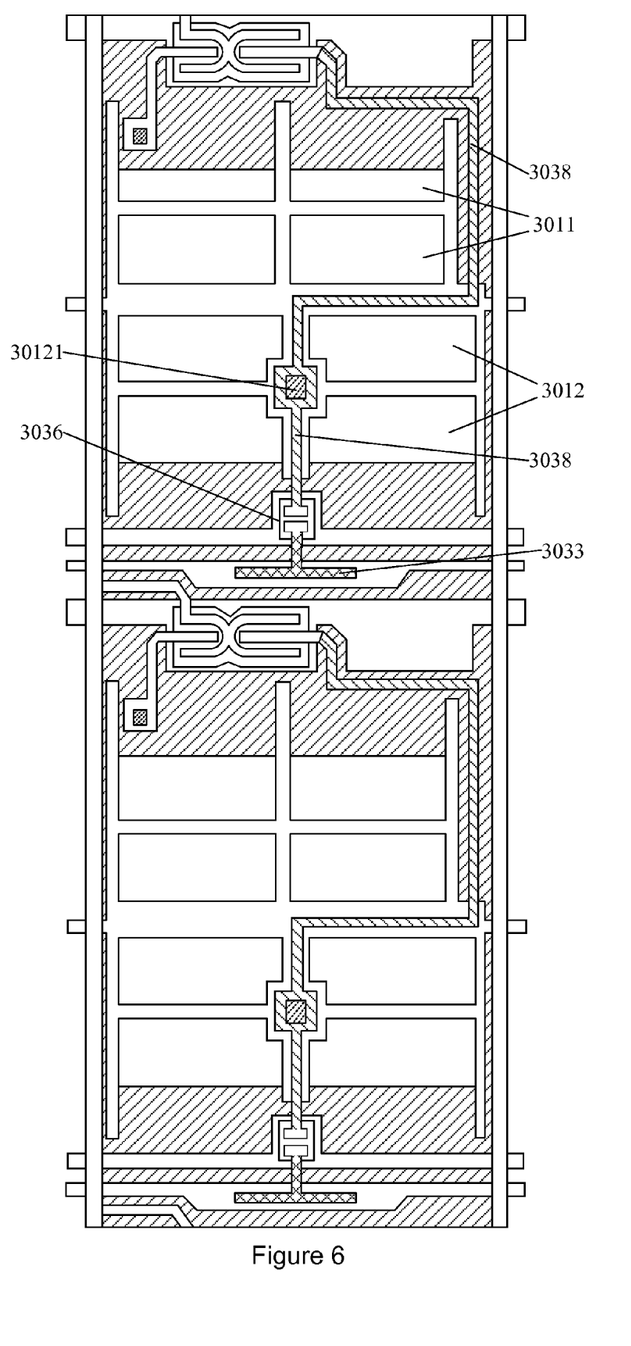
FIG. 6 is a schematic view showing the structure of another embodiment of the circuit of FIG. 4.

In addition, refer to FIG. 6. The instant embodiment in FIG. 6 differs from the circuit layout in FIG. 5 in that sub data line 3038 can bypass first main pixel area 3011 and pass first sub pixel area 3012 to transmit data signal to sub pixel electrode 30121 of first sub pixel area 3012. Sub pixel electrode 30121 is connected to third TFT 3036 through sub data line 3038 for transmitting data signal to first share capacitor 3033. Under the effect of first share capacitor 3033, a voltage difference exists between first main pixel area 3011 and first sub pixel area 3012. Specific circuit connection and driving theory can refer to the above description and will not be repeated here.

Figure 7:
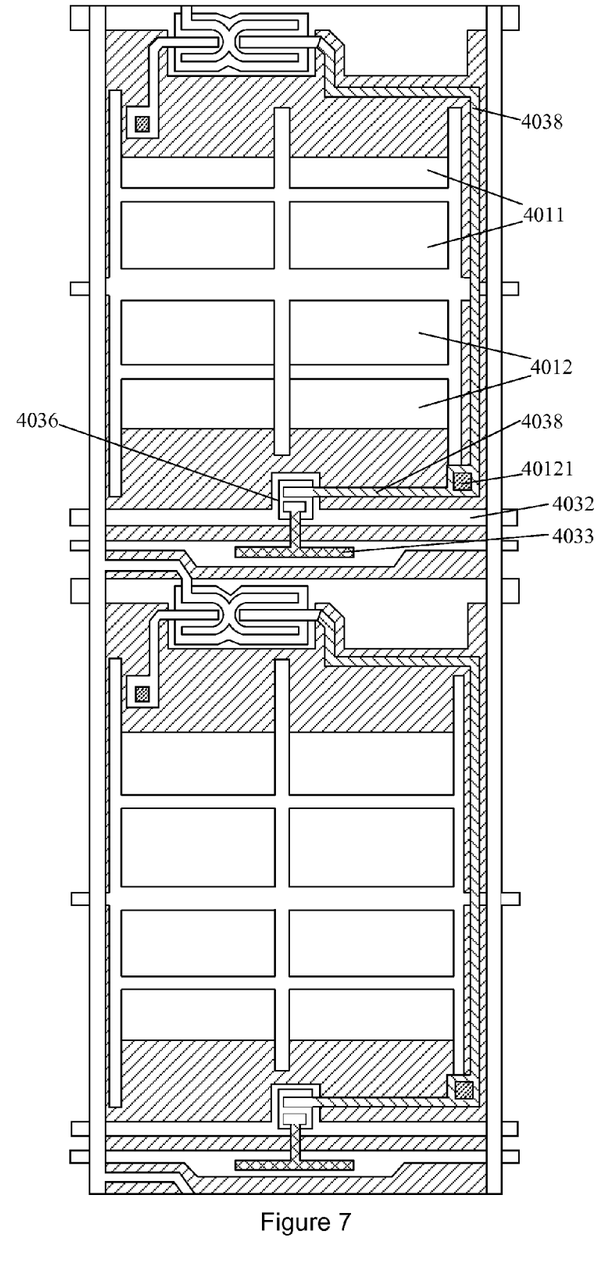
FIG. 7 is a schematic view showing the structure of yet another embodiment of the circuit of FIG. 4.

FIG. 7 is a schematic view showing the structure of yet another embodiment of the circuit of FIG. 4. The instant embodiment in FIG. 7 differs from the circuit layout in FIG. 5 in that sub data line 4038 can bypass first main pixel area 4011 and first sub pixel area 4012, that is, passes around the edge of first main pixel area 4011 and first sub pixel area 4012, to transmit data signal to sub pixel electrode 40121 of first sub pixel area 4012. At this point, sub pixel electrode 40121 is laid out in the area where first share gate 4032 and first share capacitor 4033 are located. Sub pixel electrode 40121 is connected to third TFT 4036 through sub data line 4038 for transmitting data signal to first share capacitor 4033. Under the effect of first share capacitor 4033, a voltage difference exists between first main pixel area 4011 and first sub pixel area 4012. Specific circuit connection and driving theory can refer to the above description and will not be repeated here.

In summary, in 3D display mode, the array substrate of the present embodiment can make the liquid crystal display panel in 3D display mode improve color difference at large view angle to reduce color distortion, as well as improve opening ratio and penetration ratio of the liquid crystal display panel to increase luminance of the liquid crystal display panel.

Figure 8:
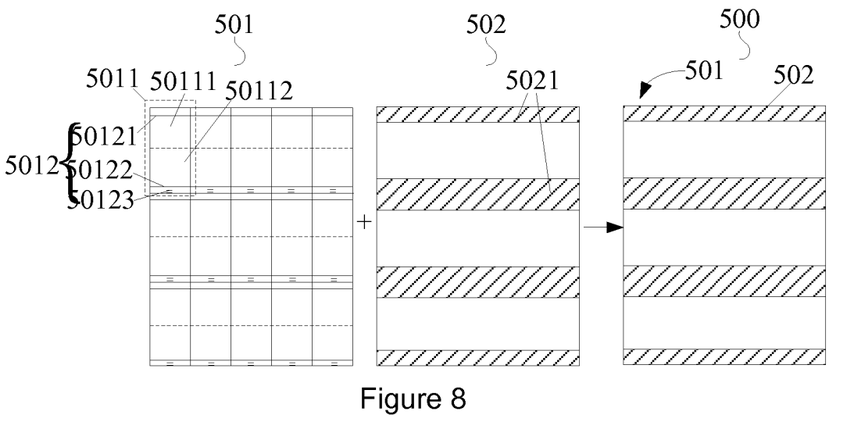
FIG. 8 is a schematic view showing the structure of an embodiment of the liquid crystal display panel according to the present invention.

Referring to FIG. 8, FIG. 8 is a schematic view showing the structure of an embodiment of the liquid crystal display panel according to the present invention.

Liquid crystal display panel 500 comprises array substrate 501 and color filter substrate 502. For better illustration in the figure, array substrate 501 and color filter substrate 502 are shown in a planar manner instead of the normal stacking manner. Color filter substrate 502 comprises black matrix 5021; array substrate comprises a plurality of pixel units 5011, and each pixel unit 5011 comprises main pixel area 50111 and sub pixel area 50112; circuit 5012 affecting on pixel unit 5011; wherein circuit 5012 is laid out between pixel units 501, and at least partially located within vertical projection area of black matrix 5021.

Circuit 5012 comprises charge gate 50121, share gate 50122 and share capacitor 50123, wherein charge gate 50121, share gate 50122 and share capacitor 50123 of a pixel unit 5011 are adjacent respectively to share gate 50122 and share capacitor 50123 of an adjacent pixel unit 5011, and charge gate 50121 of another adjacent pixel unit 5011. It is understood that circuit 5012 is laid out between two vertically adjacent pixel units.

In the instant embodiment, circuit 5012 further comprises sub data line (not shown). The sub data line is for inputting data signal to sub pixel area 50112 and share capacitor 50123 so that a voltage level difference exists between main pixel area 50111 and sub pixel area 50112 under the effect of share capacitor 50123, which makes the liquid crystal display panel in 3D display mode having the effect of low color washout. The specific layout of sub data line can refer to FIG. 5-FIG. 7, and the description is omitted here.

The wiring of circuit 5012 also provides the effect of black matrix. The placement of wiring in the projection area of black matrix 5021 of color filter substrate 502 can avoid occupying additional active area. When increasing width of black matrix 5021 to satisfy the demand on 3D display at large view angle, the impact on the active areas of main pixel area 50111 and sub pixel area 50112 can be reduced so as to improve opening ratio and penetration ratio of liquid crystal display panel to increase luminance of liquid crystal display panel.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. An array substrate for FPR 3D liquid crystal display, characterized in that comprises:
    a plurality of pixel units, some of the plurality of pixel units for forming left-eye signal being referred as left-eye pixel units, and another some of the plurality of pixel units for forming right-eye signal being referred as right-eye pixel units, the left-eye pixel units and the right-eye pixel units being alternately arranged, and each of the left-eye and right-eye pixel units comprising a main pixel area and a sub pixel area;
    circuit for affecting the left-eye and right-eye pixel units and being laid out at boundary areas of the left-eye pixel units and the right-eye pixel units, the circuit comprising: a charge gate, a share gate and a share capacitor, wherein the charge gate of one left-eye pixel unit and the share gate and share capacitor of the one left-eye pixel unit are laid out at two opposite sides of the one left-eye pixel unit, the charge gate, share gate and share capacitor of the one left-eye pixel unit are respectively adjacent to share gate and share capacitor of an adjacent right-eye pixel unit and charge gate of another adjacent right-eye pixel unit; and
    the array substrate further comprises first TFT, second TFT and third TFT; first TFT and second TFT for respectively controlling displaying and close of main pixel area and sub pixel area, third TFT being connected to share capacitor for controlling voltage difference existing between main pixel area and sub pixel area.

2. The array substrate as claimed in claim 1, characterized in that:
    the circuit comprises a sub data line for inputting electrical signal to sub pixel area, the sub data line passes main pixel area and sub pixel area for inputting electrical signal to sub pixel area and share capacitor.

3. The array substrate as claimed in claim 1, characterized in that:
    the circuit comprises a sub data line for inputting electrical signal to sub pixel area, the sub data line bypasses main pixel area and passes sub pixel area for inputting electrical signal to sub pixel area and share capacitor.

4. The array substrate as claimed in claim 1, characterized in that:
    the circuit comprises a sub data line for inputting electrical signal to sub pixel area, the sub data line bypasses main pixel area and sub pixel area for inputting electrical signal to sub pixel area and share capacitor.

5. The array substrate as claimed in claim 1, characterized in that:
    the charge gate of one right-eye pixel unit and the share gate and share capacitor of the one right-eye pixel unit are laid out at two opposite sides of the one right-eye pixel unit, the charge gate, share gate and share capacitor of the one right-eye pixel unit are respectively adjacent to share gate and share capacitor of an adjacent left-eye pixel unit and charge gate of another adjacent left-eye pixel unit.

6. An FPR 3D liquid crystal display panel, which comprises:
    an array substrate and a color filter substrate;
    the color filter substrate comprising black matrix; and
    the array substrate comprising:
    a plurality of pixel units, some of the plurality of pixel units for forming left-eye signal being referred as left-eye pixel units, and another some of the plurality of pixel units for forming right-eye signal being referred as right-eye pixel units, the left-eye pixel units and the right-eye pixel units being alternately arranged, and each of the left-eye and right-eye pixel units comprising a main pixel area and a sub pixel area; and
    circuit for affecting the left-eye and right-eye pixel units and being laid out at boundary areas of the left-eye pixel units and the right-eye pixel units, and at least a part of circuit being located in vertical projection area of black matrix;
    wherein the circuit comprises a charge gate, a share gate and a share capacitor, the charge gate of one right-eye pixel unit and the share gate and share capacitor of the one right-eye pixel unit are laid out at two opposite sides of the one right-eye pixel unit, the charge gate, share gate and share capacitor of the one right-eye pixel unit are respectively adjacent to share gate and share capacitor of an adjacent left-eye pixel unit and charge gate of another adjacent left-eye pixel unit; and
    the array substrate further comprising first TFT, second TFT and third TFT; first TFT and second TFT for respectively controlling displaying and close of main pixel area and sub pixel area, third TFT being connected to share capacitor for controlling voltage difference existing between main pixel area and sub pixel area.

7. The liquid crystal display panel as claimed in claim 6, characterized in that:
    the circuit comprises a data line for inputting electrical signal to sub pixel area, the data line passes main pixel area and sub pixel area for inputting electrical signal to sub pixel area and share capacitor.

8. The liquid crystal display panel as claimed in claim 6, characterized in that:
    the circuit comprises a data line for inputting electrical signal to sub pixel area, the data line bypasses main pixel area and passes sub pixel area for inputting electrical signal to sub pixel area and share capacitor.

9. The liquid crystal display panel as claimed in claim 6, characterized in that:
   the circuit comprises a data line for inputting electrical signal to sub pixel area, the data line bypasses main pixel area and sub pixel area for inputting electrical signal to sub pixel area and share capacitor.

10. The liquid crystal display panel as claimed in claim 6, characterized in that:
    the charge gate of one left-eye pixel unit and the share gate and share capacitor of the one left-eye pixel unit are laid out at two opposite sides of the one left-eye pixel unit, the charge gate, share gate and share capacitor of the one left-eye pixel unit are respectively adjacent to share gate and share capacitor of an adjacent right-eye pixel unit and charge gate of another adjacent right-eye pixel unit.

* * * * *